United States Patent Office 2,811,523
Patented Oct. 29, 1957

2,811,523
3,4-DIHYDRO-2H-1,3-BENZOXAZINES

Raymond H. Rigterink, Midland, Mich., assignor to The Dow Chemical Company, Midland, Mich., a corporation of Delaware No Drawing. Application March 2, 1956,
Serial No. 568,985

5 Claims. (Cl. 260—244)

This invention is concerned with 3,4-dihydro-2H-1,3-benzoxazines having the structure

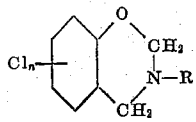

wherein R is a structure containing a cyclic radical and selected from the group consisting of cyclohexyl, benzyl and chlorophenyl and $n$ is an integer from 1 to 2, inclusive. These new compounds are crystalline solids soluble in many common organic solvents and of very low solubility in water. They are useful as antimicrobial agents for the control of various bacteria and fungi, and as herbicides for the control of plant growth.

The new 3,4-dihydro-2H-1,3-benzoxazines may be prepared by causing an amine having the formula, RNH$_2$, to react with formaldehyde to form an intermediate formaldehyde condensation product of the amine. The latter is then caused to react with the appropriate phenolic compound to form the desired 3,4-dihydro-2H-1,3-benzoxazine.

In carrying out the first step of the reaction, a molecular proportion of the amine is added to two molecular proportions of formaldehyde in an appropriate solvent such as methanol or ethanol as reaction medium. The reaction takes place smoothly in the temperature range of from 10° to 35° C. with the formation of the desired intermediate formaldehyde condensation product of the amine. The reaction is somewhat exothermic and cooling may be required to maintain temperature control.

In the second step of the reaction, about one molecular proportion of the phenolic compound or an alcoholic solution thereof is added to the reaction mixture prepared as described above. The reaction takes place smoothly when the mixture is heated over the temperature range of from 75° to 100° C. for a period of from 15 minutes to several hours. The mixture is usually stirred during the heating period to facilitate reaction. The product may precipitate from the reaction mixture during the heating period or upon cooling the mixture after completion of the reaction. The product, if a solid, is removed from the cooled mixture by filtration and purified by conventional methods such as recrystallization. The product, if an oil, may be isolated from the reaction mixture by (1) adding thereto, toluene and aqueous alkali, (2) agitating the resulting heterogeneous mixture, (3) mechanically separating the toluene and aqueous fractions, such as by decantation and (4) distilling the toluene fraction to remove the solvent and recover as residue the desired 3,4-dihydro-2H-1,3-benzoxazine product. The latter may then be purified by recrystallization from a polar solvent such as ethanol.

The following examples illustrate the invention, but are not to be construed as limiting.

Example 1.—6-chloro - 3 - (3'-chlorophenyl)-3,4-dihydro-2H-1,3-benzoxazine

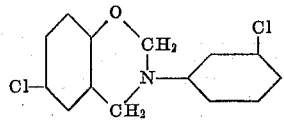

60 grams (2.0 moles) of paraformaldehyde, 1.0 gram of potassium hydroxide and 80 milliliters of methanol were heated with stirring to dissolve the paraformaldehyde. The resulting solution was then cooled and 127.6 grams (1.0 mole) m-chloroaniline added portionwise with stirring while the temperature was maintained from 20° to 30° C. The addition took about 0.25 hour. 128.6 grams (1.0 mole) of p-chlorophenol was then added to the mixture and the latter then heated from 83° to 85° C. under reflux while stirring for one hour. The mixture was then cooled whereupon it solidified with the separation of a 6-chloro-3-(3'-chlorophenyl)-3,4-dihydro-2H-1,3-benzoxazine product. The product crystals were removed from the mixture by filtration, washed, dried, and then recrystallized from 95 percent ethanol to obtain white granular crystals melting from 103° to 104.5° C. The latter had a chlorine content of 25.08 percent; the theoretical value is 25.3 percent.

Example 2.—3 - benzyl-6-chloro-3,4-dihydro-2H-1,3-benzoxazine

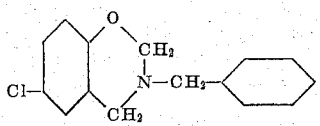

60 grams (2.0 moles) of paraformaldehyde, 1.0 gram of potassium hydroxide and 80 milliliters of methanol were heated with stirring to dissolve the paraformaldehyde. The resulting solution was then cooled to about 30° C. and 107.2 grams (1.0 mole) of benzylamine added portionwise with stirring while the temperature was maintained from 30° to 40° C. The addition took about 0.25 hour. 128.6 grams (1.0 mole) of p-chlorophenol was then added to the mixture and the resulting mixture heated from 82° to 85° C. under reflux for 0.25 hour. The mixture was then cooled whereupon a heavy oil precipitated. The methanolic mixture was separated from the oil by decantation. Aqueous 10 percent sodium hydroxide solution and toluene were added to the above obtained oil, the resulting heterogeneous mixture agitated by shaking in a separatory funnel and the aqueous solution then drained from the organic solution. The toluene solvent was distilled to obtain a 3-benzyl-6-chloro-3,4-dihydro-2H-1,3-benzoxazine product as a pale, yellow, viscous oily residue. The latter was recrystallized from ethanol to obtain a white crystalline product melting from 49° to 51° C. The latter had a nitrogen content of 5.52 percent. The theoretical value is 5.4 percent.

Example 3.—6 - chloro-3-(3',4'-dichlorophenyl)-3,4-dihydro-2H-1,3-benzoxazine

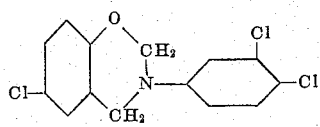

60 grams (2.0 moles) of paraformaldehyde, 1.0 gram of potassium hydroxide and 80 milliliters of methanol were heated with stirring to dissolve the paraformaldehyde. The resulting solution was cooled to about 30° C. and 162 grams (1.0 mole) of 3,4-dichloroaniline was added portionwise with stirring while the temperature was maintained below 30° C. 128.6 grams (1.0 mole) of p- chlorophenol was then added to the mixture and the resulting mixture heated under reflux and stirred for one hour. The mixture was cooled in an ice water bath whereupon the mixture turned almost immediately into a semi-solid mass. A solid 6-chloro-3-(3,4-dichlorophenyl)-3,4-dihydro-2H-1,3-benzoxazine product was separated therefrom by filtration. The latter was washed with cold methanol and recrystallized from 2-methoxyethanol to obtain tan, crystalline needles, melting from 147° to 148.5° C. The product had a nitrogen content of 4.66 percent. The theoretical value is 4.44 percent.

*Example 4.—6-chloro - 3 - cyclohexyl-3,4-dihydro-2H-1,3-benzoxazine*

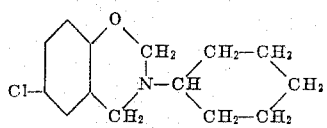

99 grams (1.0 mole) of cyclohexylamine was added with stirring to a solution of 162 grams (2.0 moles) of a 36–38 percent aqueous formaldehyde in 200 milliliters of methanol while the mixture was cooled to maintain the temperature below 35° C. 128 grams (1.0 mole) of p-chlorophenol was dissolved in 200 milliliters of methanol and added to the above reaction mixture. The resulting mixture was heated at reflux temperature for two hours. During the course of the heating, two immiscible liquid layers formed. The lower liquid layer solidified upon subsequent cooling of the reaction mixture. The upper methanolic layer was decanted off to leave as residue a 6 - chloro - 3 - cyclohexyl-3,4-dihydro-2H-1,3-benzoxazine product. The latter was recrystallized from 95 percent ethanol to obtain a white crystalline product melting from 95° to 96.5° C. The latter had a chlorine content of 13.68 percent. The theoretical value is 14.1 percent.

*Example 5.—3-cyclohexyl - 6,8 - dichloro-3,4-dihydro-2H-1,3-benzoxazine*

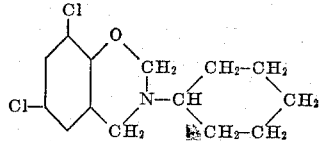

In a similar manner, 99.2 grams (1.0 mole) of cyclohexylamine is added with stirring to 162 grams (2.0 moles) of a 36 to 38 percent aqueous formaldehyde in 250 milliliters of methanol while the mixture is cooled to maintain the temperature below 35° C. 163 grams (1.0 mole) of 2,4-dichlorophenol dissolved in 150 milliliters is added to the above mixture and the resulting mixture heated at reflux temperature for several hours. After completion of the heating, a 3-cyclohexyl-6,8-dichloro-3,4-dihydro-2H-1,3-benzoxazine product is isolated from the reaction mixture by adding thereto toluene and dilute sodium hydroxide solution, agitating thoroughly and separating the immiscible layers by decantation. The toluene solvent is removed by distillation and the desired product obtained as a residue. The latter may be purified by recrystallization from ethanol. The molecular weight of the product is 300.28.

In a similar manner, other 3,4-dihydro-2H-1,3-benzoxazines may be prepared as follows:

6 - chloro-3-(2',4'-dichlorophenyl)-3,4-dihydro-2H-1,3-benzoxazine by the reaction of 2,4-dichloroaniline, formaldehyde and p-chlorophenol.

3 - benzyl-6,8-dichloro-3,4-dihydro-2H-1,3-benzoxazine by the reaction of benzylamine, formaldehyde and 2,4-dichlorophenol.

3-(3'-chlorophenyl)-6,8-dichloro - 3,4 - dihydro-2H-1,3-benzoxazine by the reaction of m-chloroaniline, formaldehyde and 2,4-dichlorophenol.

The products of the preceding examples are effective as germicides and may be employed for the control of bacterial and fungal organisms. They also may be used as herbicides for the control of undesired vegetation. In a representative operation, 6-chloro-3-cyclohexyl-3,4-dihydro-2H-1,3-benzoxazine gave 100 percent controls of vegetation when applied at a dosage of 12.5 pounds per acre to soil planted with seeds of Japanese millet, *Echinochloa frumentacea*, and wild oat, *Avena fatua*. The active ingredient was applied as an aqueous composition.

I claim:

1. A 3,4-dihydro-2H-1,3-benzoxazine having the formula:

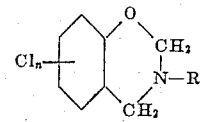

wherein R is a structure containing a cyclic radical and selected from the group consisting of cyclohexyl, benzyl and chlorophenyl and $n$ is an integer from 1 to 2, inclusive.

2. 6 - chloro-3-cyclohexyl-3,4-dihydro-2H-1,3-benzoxazine.

3. 6-chloro - 3 - (3'-chlorophenyl)-3,4-dihydro-2H-1,3-benzoxazine.

4. 3 - benzyl-6-chloro-3,4-dihydro-2H-1,3-benzoxazine.

5. 6 - chloro - 3-(3',4'-dichlorophenyl)-3,4-dihydro-2H-1,3-benzoxazine.

References Cited in the file of this patent

UNITED STATES PATENTS 2,633,466   Wallingford _____ Mar. 31, 1953

FOREIGN PATENTS 695,550   Great Britain _____ Aug. 12, 1953

OTHER REFERENCES

Burke: J. Am. Chem. Soc., vol. 71, pp. 609–12 (1949).
Burke et al.: J. Am. Chem. Soc., vol. 74, pp. 602–5 (1952).